(12) United States Patent
Janugani

(10) Patent No.: US 11,470,363 B2
(45) Date of Patent: Oct. 11, 2022

(54) DYNAMICALLY INTERACTIVE DIGITAL MEDIA DELIVERY

(71) Applicant: DISH Network L.L.C., Englewood, CO (US)

(72) Inventor: Swapna Janugani, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/911,635

(22) Filed: Jun. 25, 2020

(65) Prior Publication Data

US 2020/0329264 A1 Oct. 15, 2020

Related U.S. Application Data

(63) Continuation of application No. 16/197,014, filed on Nov. 20, 2018, now Pat. No. 10,735,780.

(51) Int. Cl.
*H04N 21/234* (2011.01)
*H04N 21/4415* (2011.01)
*H04N 21/858* (2011.01)
*H04N 21/8545* (2011.01)
*H04N 21/41* (2011.01)

(52) U.S. Cl.
CPC . *H04N 21/23424* (2013.01); *H04N 21/41265* (2020.08); *H04N 21/4415* (2013.01); *H04N 21/8545* (2013.01); *H04N 21/8586* (2013.01)

(58) Field of Classification Search
CPC ......... H04N 21/23424; H04N 21/4415; H04N 21/42207; H04N 21/8586; H04N 21/8545; H04N 21/472; H04N 21/435; H04N 21/44222; H04N 21/4722; H04N 21/478; H04N 21/4316; H04N 21/4622; H04N 21/2542; H04N 21/2665; H04N 21/4524; H04N 21/4532; H04N 21/41265; H04N 21/25891; H04N 21/43637; H04N 21/8133; G06Q 30/0641
USPC .......................................................... 725/32
See application file for complete search history.

(56) References Cited

U.S. PATENT DOCUMENTS

| 2008/0092158 A1 | 4/2008 | Bhatnager et al. |
| 2013/0091246 A1* | 4/2013 | Urbanski ............... H04L 12/18 709/217 |
| 2013/0198642 A1 | 8/2013 | Carney et al. |

(Continued)

OTHER PUBLICATIONS

F. Vega, J. Medina, V. Saquicela, K. Palacio-Baus and M. Espinoza, "Towards a multi-screen interactive ad delivery platform," 2017 XLIII Latin American Computer Conference (CLEI), Cordoba, Argentina, 2017, pp. 1-10, doi: 10.1109/CLEI2017.8226400. (Year: 2017).*

*Primary Examiner* — Cynthia M Fogg
(74) *Attorney, Agent, or Firm* — Kilpatrick Townsend & Stockton LLP

(57) ABSTRACT

Secondary media content is displayed based on metadata of primary media content, the secondary content specifying a data transfer action. Input can be received from a paired wireless input device. Upon receiving the input, the data transfer action can be executed, wherein the data transfer action includes retrieving transferable data specified according to the secondary media content; and transmitting the retrieved transferable data to an unpaired device via a network.

20 Claims, 4 Drawing Sheets

(56) References Cited

U.S. PATENT DOCUMENTS

| | | | |
|---|---|---|---|
| 2013/0238426 A1* | 9/2013 | Mukhopadhyay | G06Q 30/02 705/14.49 |
| 2013/0290101 A1* | 10/2013 | Arini | G06Q 30/0207 705/14.55 |
| 2013/0347018 A1 | 12/2013 | Limp et al. | |
| 2014/0040935 A1* | 2/2014 | Gharachorloo | H04N 21/25891 725/23 |
| 2014/0229983 A1* | 8/2014 | Malik | H04N 21/6175 725/34 |
| 2016/0077710 A1* | 3/2016 | Lewis | G06F 3/011 715/716 |
| 2017/0214961 A1* | 7/2017 | Oak | H04N 21/41265 |
| 2019/0281343 A1* | 9/2019 | Hussain | H04N 21/47815 |
| 2019/0373337 A1* | 12/2019 | Martell | H04N 21/812 |
| 2020/0356228 A1* | 11/2020 | Carney | H04N 21/4122 |

* cited by examiner

DYNAMICALLY INTERACTIVE DIGITAL MEDIA DELIVERY

CROSS-REFERENCES TO RELATED APPLICATIONS

This application is a continuation of U.S. patent application Ser. No. 16/197,014, filed on Nov. 20, 2018, entitled "Dynamically Interactive Digital Media Delivery," the disclosure of which is hereby incorporated by reference in its entirety for all purposes.

BACKGROUND

Existing media systems provide media content to users by streaming the data to user devices such as mobile telephones and laptops, and media devices such as set-top boxes, gaming consoles, televisions, etc.

DETAILED DESCRIPTION

Exemplary System

A media device connected to a wide area network can include hardware and software to receive and provide for display an item of media content, such as a sporting event, a news program, a movie, etc. Along with such item of media content selected by a user for consumption, and thus referred to herein as "primary media content," the media device can display additional media content, referred to herein as "secondary media content," based on various factors, including values in metadata of primary media content, such as a category of the primary media content. A data transfer action can be specified in metadata or other accompanying data of the secondary media content. A data transfer action specifies transferring data from a first computer to a second computer via a network (i.e., via one or more intermediate devices connected via wireless or wired media). The data to be transferred is referred to as "transferable data." The display of secondary media content can request user input, which can be received in the media device from a paired wireless input device. Upon receiving the input from the paired wireless device responsive to the secondary media content, the media device can execute the data transfer action, which includes retrieving transferable data specified according to the secondary media content; and transmitting the retrieved transferable data to an unpaired device via a network.

Figure 1:
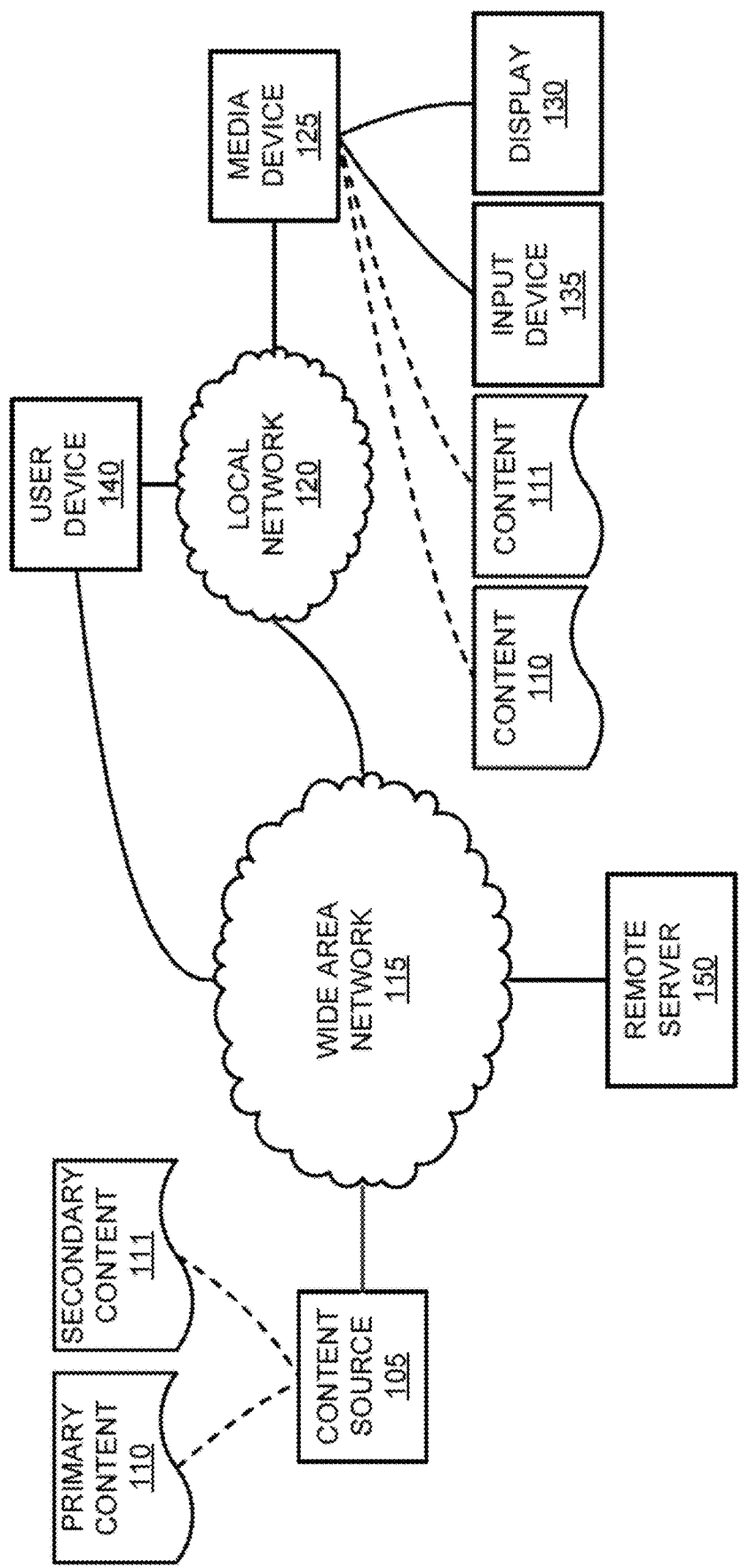
FIG. 1 is a diagram of an exemplary media system for providing media content items.
Figure 2:
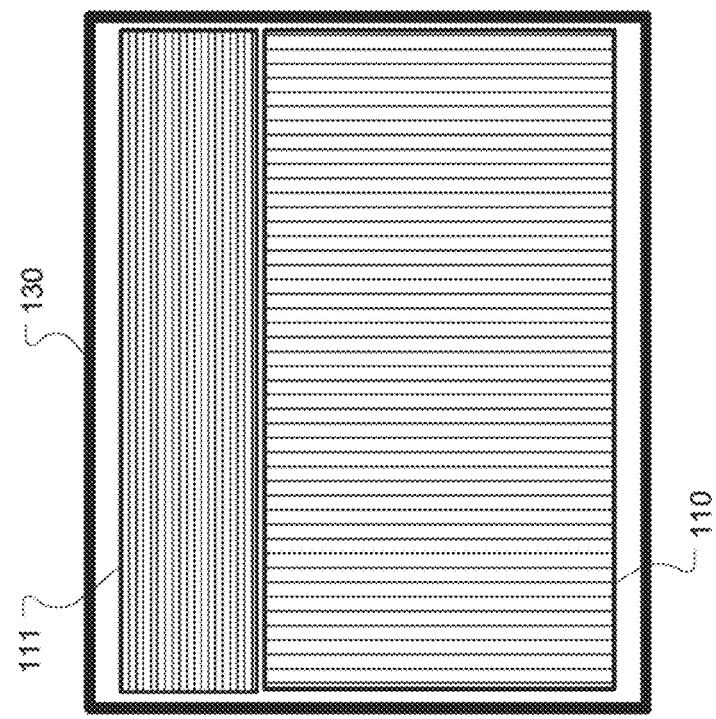
FIG. 2 is a block diagram of a display that includes primary and secondary media content.

FIG. 1 is a block diagram of an exemplary content delivery system 100. A media content source 105 stores media content including primary media content 110 and secondary media content 111. The primary media content is typically intended for consumption at a consumer media device 125, e.g., as news or sports content, as an episode of a program, as a movie, etc. The secondary media content 111 can be displayed with primary content 110, and is typically not displayed without primary content 110. On the other hand, primary content 110 could be displayed without secondary content 111. In one example, illustrated in FIG. 2, a display 130 could include secondary media content 111 as a banner or the like below or (as illustrated) above primary media content 110.

Figure 3:
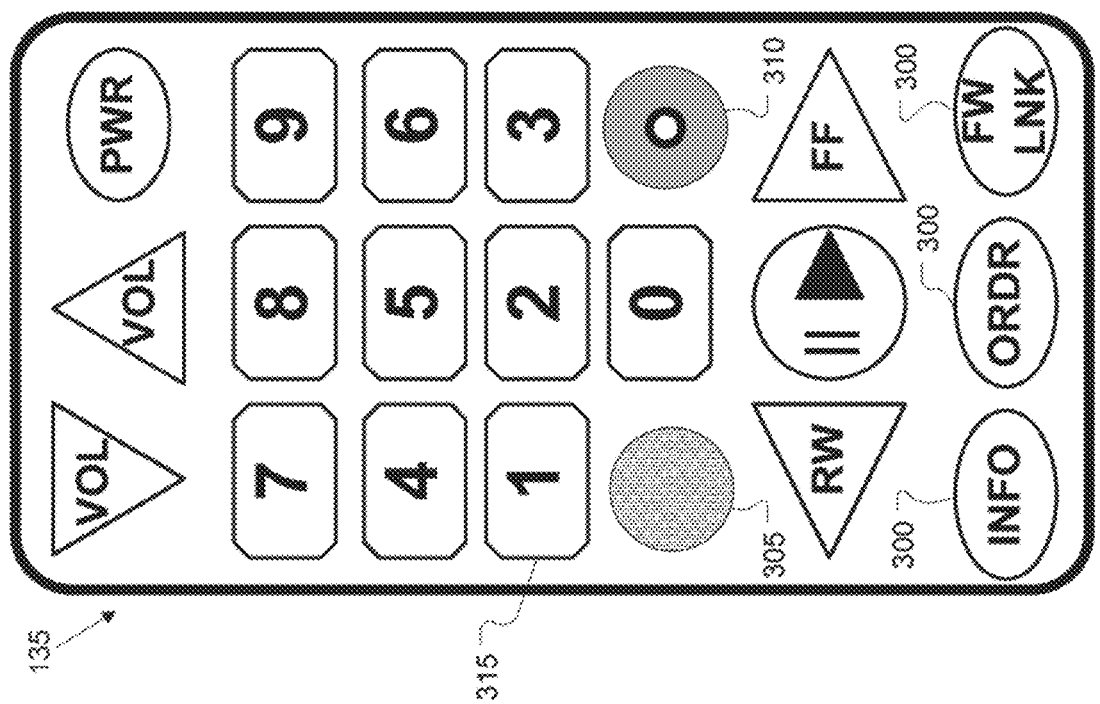
FIG. 3 is a block diagram of an exemplary input device.

The secondary media content 111 includes a request for user input along with other information. For example, the secondary media content 111 can include a textual and/or graphical display to request user input in response to the secondary input 111. As illustrated in FIG. 3, the input can be provided via one of one or more dedicated input keys 300 on a dedicated, i.e., paired, wireless input device 135. The input can request, e.g., to forward information to one or more addresses (e.g., e-mail addresses, phone number addresses for text messages, etc.) information, e.g., a textual description, an image, a hyperlink, etc., related to the secondary content 111. Input prompted by secondary content 111 could alternatively or additionally specify to display further information, to execute a transaction, e.g., to purchase food or other items for delivery to a location of the media device 125, etc.

User input may be provided via a button or key 300 or other physical input structure of a dedicated device 135, and/or via some other mechanism, such as other keys or physical input structures provided on a paired device 135, e.g., alphanumeric or numeric keys 315. Yet further alternatively or additionally, paired device 135 input could be voice input, e.g., via a microphone 305 (see FIG. 3) included in the device 135, possibly after a camera 310 in the device 135 captures an image or images of a user's face to identify the user via facial recognition techniques. Further, secondary media content 111 can include one or more requests for user input, and a request for user input included in an item of secondary media content 111 can trigger one or more data transfer actions by the media device 125.

In one example, a user selection via an input device 135 can trigger the media device 125 to initiate a transaction to order a specific item for delivery to a location of the media device 125. Thus, in this example, transferable data received by the media content device 125, e.g., from a memory thereof, includes a location, payment information, contact information such as email address, phone number, etc., for a transaction, and/or other data relevant to an ordering transaction, for submission to a remote processing server 150. In another example, a user selection via an input device 135 can trigger the media content device 125 to send a hyperlink or the like to a specified network address, e.g., an email address or short message service (SMS) address or the like, so that the user can complete a transaction and/or obtain more information about a product, e.g., food offered for delivery, described in the secondary content 111. The media content device 125 can store address information for a user or users, e.g., an address for text messages, and/or can request user input of such an address and/or selection of two or more stored addresses. In yet another example, a user input via an input device 135 can trigger the media content device 125 to display additional secondary media content 111, e.g., a menu or a portion of a menu of food items that can be ordered, after which user input to trigger sending a hyperlink and/or to initiate a transaction to order an item or items can be provided from the input device 135 to the media device 125.

The content 110, 111 may be provided from the content source 105 via a wide area network 115 to a media device 125. Further, the content 110, 111 may be displayed to a user via the media device 125 and/or a media display device 130 such as a television, video monitor, or the like. When content 110 is referred to herein as being "displayed" it is to be understood that such display could include any possible mode of displaying media data, such as a display of visual data, audio data, etc. For example, content 110, 111 could be displayed by showing video or image data on a screen with or without sound, by playing audio data with or without a visual display, etc.

The media content source 105 may be any one, or some combination, of various mechanisms for delivering media content 110, and may depend on a type of media content 110 being provided. The media content source 105 can include a computer server (or, more typically, a plurality of such computers), i.e., a device having a processor and a memory, to deliver media content 110, and/or to perform processing as described herein. By way of example and not limitation, media content 110 data may be provided as video-on-demand through a cable, satellite or internet protocol television (IPTV) distribution system, as streaming Internet video data, or as some other kind of data. In general, examples of media content 110 include various types of data, including audio, video, images, etc. Accordingly, examples of content sources 105 may include one or more of a cable or satellite television head end, a video streaming service such as generally includes a multimedia web server (or some other computing device), or some other mechanism for delivering multimedia data.

The wide area network (or WAN) 115 represents one or more mechanisms, typically including the Internet, for delivering content 110 from a content source 105 to a media device 125. The WAN 115 is distinguished from a local area network (or LAN) 120 in that the WAN 115 can encompass any distance on the surface of the earth, whereas the LAN 120 is limited to a specified geographic area, typically a single building, complex, or campus. The network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). A LAN 120 may include wireless and/or wired mechanisms, such as Wifi®, Ethernet, etc., but typically does not include mechanisms designed for long-range communications, such as cellular.

Media content 110 is delivered via the network 115 in a digital format, e.g., as compressed audio and/or video data. For example, one possible format is MPEG, which refers to a set of standards generally promulgated by the International Standards Organization/International Electrical Commission Moving Picture Experts Group (MPEG). Another possible format is according to H.264, which refers to a standard promulgated by the International Telecommunications Union (ITU). Accordingly, by way of example and not limitation, media content 110 may be provided in a format such as the MPEG-2 or the H.264/MPEG-4 Advanced Video Coding standards (AVC) (H.264 and MPEG-4 at present being consistent), or according to some other standard or standards. For example, media content 110 could be audio data formatted according to standards such as MPEG-1 or MPEG-2 Audio Layer III (MP3), Advanced Audio Coding (AAC), etc. Further, the foregoing standards generally include support for metadata, such as the metadata discussed herein. Further, content 110 that uses a standard or standards that do not explicitly include provisions for metadata, or standards that have limitations on metadata size, may be supplemented with discrete metadata (e.g., separate files or data structures) that uses either embedded metadata or information such as timecodes/time stamps/timing intervals which can be used to modify the standard content.

Content 110 metadata generally includes indexes, pointers, or other mechanisms for identifying locations in media content 110, e.g., a stream of frames of video data. In addition, content 110 metadata can include data describing an item of media content 110, e.g., a title, an author, one or more cast members, a date of creation, etc. Moreover, content 110 metadata can include a media content category, which in the present context means a description of a type or genre of media content, e.g., sporting event (or, more granularly, football, baseball, cricket, rugby, curling, etc.), news program, comedy (or, to provide another set of more granular examples, romantic comedy, screwball comedy, adult comedy, teen comedy, etc.), drama, horror, documentary, etc. As discussed further below, a category of primary content 110 could determine a category and/or specific item of secondary content 111. For example, a sporting event category of primary content 110 could be a basis for selecting secondary content 111 offering a particular type of food delivery, e.g., pizza. To provide just one more example from many that are possible, a movie-comedy category of primary content 110 could be a basis for selecting secondary content 111 offering a different particular type of food delivery, e.g., Chinese food. Likewise, the content of primary content 110 could determine a category or specific item of secondary content 111. For example, if primary content 110 were a movie set in a pizza restaurant, then the secondary content 111 may comprise listings for pizza.

As mentioned above, a media device 125, e.g., located in a customer premises, can receive media content 110, 111 via a wide area network 115, and typically also via a local area network 120. For example, the wide area network 115 could include delivery via one or more of satellite, coaxial cable, or fiber-optic media to an access point in the customer premises, whereupon the media device 125 could be connected to a local area network 120 connected to the access point, and including Wi-Fi and/or ethernet or the like. The media device 125 is a computing device including one or more processors and one or more memories. Non-limiting examples of a media device 125 include a set-top box (STB), a laptop, desktop, tablet computer, game box, a television, a smart television, etc. Accordingly, the media device 125 can include a display 130, e.g., a screen and/or speaker, etc. and/or a display 130 can be a peripheral device or devices connected to the media device 125, e.g., a television, audio-visual monitor, a speaker, etc.

A dedicated or paired input device 135 may be provided to provide user input to, the media device 125. The input device 135 is referred to as "dedicated" because it is a hardware device that is provided to provide input to the media device 125 and not to any other device or devices. Thus, unlike a smart phone or the like which could have an app to control another device, such as a television, home appliance, etc., but which also could control many other devices, appliances, etc., the input device 135 is a dedicated remote control or the like, typically with one or more keys or buttons specified for a single respective operation, e.g., toggle between play and pause, stop playback, increase volume, decrease volume, etc. The input device 135 may also be referred to as a "paired" device 135 because it is specifically paired in a one-to-one relationship, e.g., using dedicated infrared transmissions in a manner conventional for remote control devices, using a communication protocol such as Bluetooth® that pairs devices, etc., with the media device 125, as opposed to other undedicated or unpaired control devices that may provide input to and receive output from many other devices.

As mentioned above, the input device 135 could be used to provide input in response to secondary media content 111. For example, the secondary content 111 could describe goods or services available for order, e.g., food available for delivery. The input device 135 could be used to select an order option presented in the secondary content 111, to provide input to obtain more information about the described goods or services that the media device 125 can then provide to the display 130 as further secondary content 111, to forward information to a user device 140, e.g., via an email or text message address, etc.

The user device 140 may be a computing device such as a mobile telephone (e.g., a smart phone running the Android or iOS operating systems), a tablet or laptop, smart wearable (smart watch, fitness band, etc.), other computing device, etc. The user device 125 includes one or more processors and one or more memories. The user device 140 may be able to communicate via the wide area network 115, e.g., via a cellular connection or the like, and/or via the local network 120. Further, the user device 140 may be able to communicate with the media device 125 via the local network 120 and/or the wide area network 115. For example, a user could provide input to the media device 125 via the device 135 in response to secondary content 111, whereupon the media device 125 could execute programming to provide a hyperlink or the like to the user device 140. By accessing content at the hyperlink, the user device 140 could display additional information related to the secondary content 111, e.g., a menu and ordering information for food items. Further, the user device 140 could be used to submit an order to a remote server 150 and/or to confirm an order made by a user selecting a key 300 and providing input to the media device 125, then forwarded to the user device 140 via the network 120.

A remote server 150 can communicate with the content source 105 and/or the media device 125 via various mechanisms including the wide area network 115. The server 150 represents one or more computing devices, i.e., including a processor and a memory storing instructions executable by the processor. The server 150 can send and receive transferable data from the content source 105 and/or device 125. For example, the server 150 could include programming to receive a request to execute a transaction, such as an order for a food item, from the media device 125. The server 150 could further include programming to provide responsive transferable data, such as a confirmation of an order, an expected time of delivery, etc. Yet further, the server 150 could include programming to receive payment information from the media device 125 or a user device 140, and/or obtain payment information based on an identifier from the media device 125 or user device 140, e.g., the identifier could be used to obtain payment information, e.g., credit card number, etc., from the content source 105.

Figure 4:
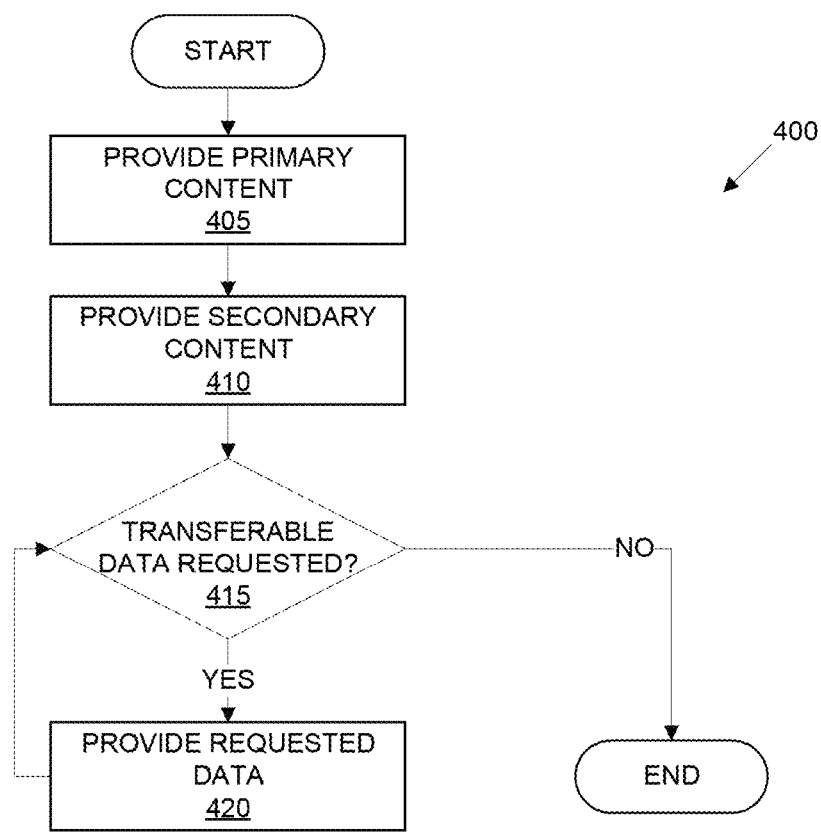
FIG. 4 illustrates an exemplary process for a media content source to provide media content.

FIG. 4 illustrates an exemplary process 400 for a media content source 105 to provide media content 110, 111. For example, blocks of the process 400 could be carried out by a computer server or the like included in the content source 105 as mentioned above.

The process 400 begins in a block 405, in which the content source 105 provides primary media content 110 in response to a request from a media device 125. For example, a user may provide input to select a television channel, to view a particular item of media content 110 such as a movie or sporting event, etc.

Next, in a block 410, the content source 105 selects secondary media content 111 to accompany the primary media content 110 being provided as described with respect to the previous process block 405 and then provides the selected secondary content 111 to the media device 125. For example, the secondary media content 111 could be commercial content, e.g., a communication providing information about items such as food available for delivery at a time that the primary content 110 is being provided. The secondary media content 111 could be selected based on one or more factors, including a time of day, a time of year, an identifier of a user selecting the primary content 110, a geographic location (e.g., a street, a municipality, a ZIP Code or other postal code, geo-coordinates according to the global navigation system (GNS), etc.) of the media device 125, a category assigned to primary media content 110 being provided, and/or other factors.

In one example, a server included in the content source 105 stores a table or the like specifying items of secondary media content 111 to be selected based on a media device 125 location and a category of primary media content 110. That is, fields or rows in the table could include an identifier for an item of secondary media content 111, a location or range of set of locations in which the item of secondary media content 111 can be provided, and a category or categories of primary media content 110 for which the item of secondary media content 111 can be provided. For example, the item of secondary media content 111 (or an identifier to facilitate retrieval thereof) could be stored in a record specifying possible categories of primary media content 110 such as "sporting event," "sporting news," "football game," "baseball game," and/or "basketball game," etc. Further, a record in the table could specify a category or categories of primary media content 110 that might specify one or more categories of secondary content 111. For example, if a record in the table specified a primary media content 110 category of "football game," that record in the table could specify one or more secondary media content 110 categories pertaining to types of takeout food for delivery, e.g., "pizza," "chicken wings," "burritos," etc.

The content source 105 could then select an item of secondary media content 111 meeting specified parameters. For example, secondary content 111 is typically provided based on a media device 125 location. Further, secondary content 111, as explained in the preceding paragraph, is typically provided according to a category of primary media content 110. Yet further, items of secondary content 111 and/or categories of secondary content 111 could be stored with time restrictions i.e., ranges of times when the secondary content 111 should or should not be provided. For example, secondary content 111 offering delivery of donuts or bagels could be restricted to a time range starting at midnight and ending at noon, whereas secondary content 111 offering delivery of pizza or sandwiches could be restricted to a time range starting at noon and ending at 2 AM. Similarly, items of secondary content 111 and/or categories of secondary content 111 could be stored with days of the week and an indicator that the secondary content 111 should or should not be provided on a specific day of the week. For example, secondary content 111 relating to pizza delivery could be stored with an indication that the secondary content 111 should be provided on Friday, Saturday, or Sunday. Secondary content 111 may also be provided based on availability of certain delivery services, such as based on time of day or delivery distance. For example, certain restaurants may have limited delivery windows, such as a pizza or Chinese food restaurants. Similarly, these restaurants may have a limited geographic delivery distance. On the other hand, many restaurants provided delivery services via third party delivery services, which may have different delivery times and geographic restrictions. The secondary content 111 may also be provided based on a user's preferred third party delivery service. For example, a local sandwich shop may provide delivery through a particular on-demand delivery service that the user prefers, and that sandwich shop may be weighted higher in the secondary content 111 compared with other restaurants provided via a less preferred third party delivery service.

Moreover, if multiple items or categories of secondary content 111 met the parameters, the content source 105 could include programming for additional criteria, such as choosing an item of secondary content 111 on a random or pseudo-random basis from items meeting the specified parameters, choosing an item of secondary content 111 consuming a lowest amount of bandwidth for transmission to the media device 125, choosing items of secondary content 111 on a round-robin basis, etc. Other parameters could also be included in a table or the like listing available secondary media content 111, e.g., times of day, times of year, and/or days of the week for displaying the content 111, etc.

Alternatively, or in addition to, the possible bases for providing secondary content 111 described above, a stored user identifier and/or stored user profile data, e.g., in a server of the content source 105, could be a basis for selecting secondary content 111. For example, a media device 125 and/or user device 140 could provide an identifier associated with one or more users to the content source 105, e.g., via the network's 115, 120 along with a request for primary content 110. Then, when secondary content 111 is to be displayed with the primary content 110, the content source 105 could retrieve a lookup table or the like specifying, for a stored user identifier, a record specifying secondary content 111 categories for the user identifier and/or a user profile for the user identifier that includes secondary content 111 categories. For example, a particular user identifier could be associated with categories such as "no pizza," or "gluten-free," etc., or, vice versa, with categories such as "Chinese food," "Indian food," etc. Likewise, the user may prefer restaurants provided by certain delivery services. The content source 105 could then select secondary content 111 avoiding or specifying indicated categories for a user identifier. Further, categories indicated for selection and/or avoidance for a specified user identifier could be used in combination with a table such as that specified above, e.g., limiting categories by times of day, day of week, etc. Yet further, a user profile could include a history of prior orders from a device 125, 140 with a particular user identifier; each order could then have a category, e.g., falafel, burritos, etc., that could then be used to specify a category of secondary content 111.

In some implementations, the process 400 can end following the block 410. However, as illustrated, if the process 400 continues, then next, in a decision block 415, the content source 105 determines whether a request for transferable data has been received. For example, in response to user input, a media device 125 could request additional secondary content 111 not provided in the block 405, e.g., additional information about an offering, such as a description of goods or services, a food menu, etc. Alternatively or additionally, a remote server 150 could request information related to a user identifier from a user device 140 and/or media device 125, e.g., stored payment information. However, stored payment information could alternatively or additionally be retrieved from a data store in the content source 105 and/or via a remote server 150, etc., according to a user or device 125, 140 identifier. (Accordingly, a server in the content source 105 and/or the remote server 150 could be PCI (Payment Card Industry) compliant.) If no transferable data is requested, then the process 400 ends. Otherwise, the process 400 proceeds to a block 420.

In the block 420, the content source 105 provides the requested transferable data, e.g., to the media device 125 and/or the server 150. The process 400 then returns to the block 415.

Figure 5:
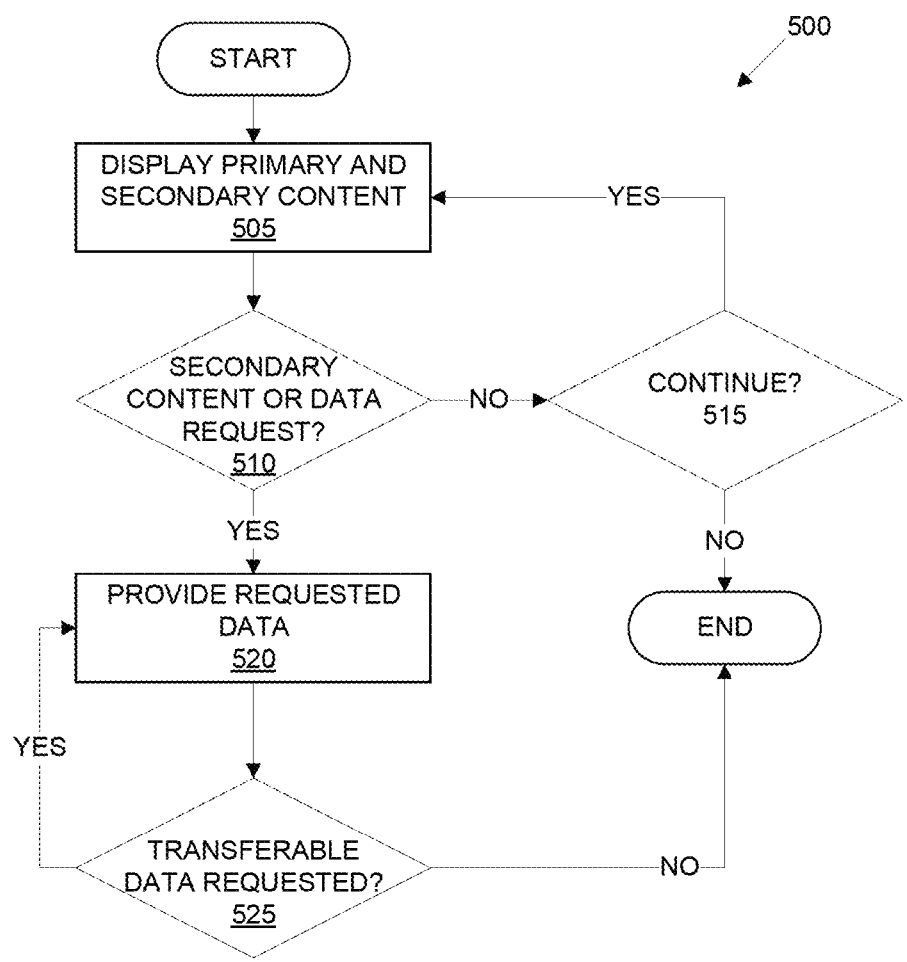
FIG. 5 illustrates an exemplary process for a media content device to dynamically display media content and transfer data from the media content device.

FIG. 5 illustrates an example process 500 for a media device 125 to display primary and secondary content 110, 111 and respond to requests based on secondary content 111. The process 500 can be carried out according to program instructions stored in a memory of the device 125, and executed by a processor thereof.

The process 500 begins in a block 505, in which the media device 125 receives primary and secondary content 110, 111 from the content source 105, and causes the content 110, 111 to be provided to a display 130. For example, the content 110 could be displayed in an electronic interactive program guide (EPG or IPG) or the like with a title, still photo, video trailer, and/or other identifying information. Alternatively or additionally, the block 505 could include primary content 110 being displayed for consumption by a user, e.g., a movie, sporting events, etc., could be provided to the display 130. In any example, the secondary content 111 can be provided along with the primary content 110, e.g., as a banner or block of information in an IPG, as a banner or in a corner of a screen in which primary content 110 is being played or shown, as text and/or graphics overlaid or superimposed on the primary content 110, etc.

Next, in a block 510, the media device 125 determines whether input has been received from the dedicated input device 135 responsive to the displayed secondary media content 111. For example, as described above, voice input, selection of a dedicated button or key, etc., could be provided from the device 135 to initiate a data transfer action, e.g., providing additional information about a vendor or item described in the media content 111, sending a hyperlink or the like to a user device 140 so that the user device 140 can access further information and/or confirm a transaction, initiating a transaction, etc. In some instances, user input may not be accepted until a user is authenticated, e.g., by providing a password or personal identification number (PIN), or being recognized according to some biometric input, e.g., facial recognition using the device 135 camera 310, voice recognition using the input via the microphone 305, fingerprint authentication using a scanner (not shown) on the device 135, etc. If no input selecting an action from the secondary content 111 is received, then the process 500 proceeds to a block 515. Otherwise, the process 500 proceeds to a block 520.

In the block 515, the device 125 determines whether the process 500 is to continue. For example, the media device 125 could be turned off, playback of primary content 110 could be terminated according to user input, a user could select an option (if such were made available) to hide secondary content 111, etc. If the process 500 is not to continue, then the process 500 ends. Otherwise, the process 500 returns to the block 505.

In the block 520, the media device 125 provides data in response to the request of the block 515. For example, if a user has provided input requesting additional data, e.g., a detailed display of food menu items, a detailed description of a product, etc., then the media device 125 causes such information to be provided to the display 130. Alternatively or additionally, if a user has provided input requesting to complete a transaction or forward a hyperlink, the media device 125 initiates the appropriate data transfer action. That is, if the input is to complete a transaction, then the media device 125 may retrieve data from its memory and/or may query a remote server such as a server in the content source 105, to provide user payment information, contact information, etc., and then may transfer such data to the data processor 150 via the network 115. Further, if the input is to forward a hyperlink or the like, the media device 125 can retrieve a hyperlink or other address from memory and provide it to a stored address and/or an address selected by a user.

Next, in a block 525, the media device 125 determines whether a request for transferable data has been received. For example, if an input in the block 520 was determined to be to complete a transaction, then a further request for transferable data will not be received, because a data transfer action responsive to the secondary content 111 has been completed. However, if a user has requested the secondary content 111 to include additional information, e.g., a display of food menu items, delivery options, item descriptions, etc., then the process 500 could return to the block 520. If no further user request is received, e.g., a predetermined period of time has elapsed, a user terminates display of the primary content 110, suppresses display of the content 111, etc., then the process 500 ends.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer comprising a processor and a memory, the memory storing instructions executable by the processor such that the computer is programmed to:

provide primary media content to a television receiver over a provider network in response to receiving a request for the primary media content from the television receiver over the provider network, the primary media content configured for display on a display device in communication with the television receiver, the request for the primary media content indicating a user identifier associated with the television receiver;

select secondary media content from a plurality of secondary contents automatically based on the providing the primary media content and based on the user identifier, the secondary media content associated with transferrable data;

direct the television receiver to display the secondary media content on the display device concurrent with displaying the primary media content;

receive, from the television receiver, a request for the transferrable data generated by the television receiver responsive to receiving input from a paired wireless input device, the paired wireless input device paired with the display device, the input indicating an interaction by a user with the display of the secondary media content;

provide the transferrable data for display to the user via an unpaired device in response to receiving the request for the transferrable data, the unpaired device identified via a remote server request based on the user identifier, the unpaired device not in direct communication with the television receiver, not paired with the television receiver, and not paired with the paired wireless input device; and receive a communication from the unpaired device corresponding to a transaction by the user initiated via the unpaired device responsive to the transferrable data.

2. The system of claim 1, wherein the computer is programmed to direct the television receiver to display the secondary media content on the display device by providing the secondary media content to the television receiver over the provider network.

3. The system of claim 1, wherein the computer is programmed to direct the television receiver to display the secondary media content on the display device by directing the television receiver to retrieve secondary media content stored by the television receiver in accordance with the selecting.

4. The system of claim 1, wherein the interaction by the user with the display device of the secondary media content is via a paired wireless input device paired with the television receiver.

5. The system of claim 1, wherein:
the primary media content comprises metadata; and
the computer is programmed to select the secondary media content based on the metadata of the primary media content.

6. The system of claim 1, wherein the computer is programmed to select the secondary media content based on one or more selection criteria based on a time at which the primary media content is being consumed, an identity of the user consuming the primary media content, a geographic location at which the primary media content is being consumed, and/or a category associated with the primary media content.

7. The system of claim 6, wherein the computer is programmed to select the secondary media content by:
selecting a set of candidate secondary media contents based on the one or more selection criteria; and
filtering the set of candidate secondary media contents to select the secondary media content according to one or more user-defined criteria.

8. The system of claim 1, wherein the computer is programmed to:
provide the transferrable data for display to the user via the unpaired device, such that the display device shows a hyperlink; and
receive the communication from the unpaired device at least responsive to the user interacting with the hyperlink.

9. The system of claim 1, wherein the computer is programmed further to:

provide, to the unpaired device, second transferrable data responsive to receiving the communication from the unpaired device, the second transferrable data being in furtherance of the transaction by the user.

10. The system of claim 1, wherein the transaction by the user is associated with a purchase transaction for a good or service indicated by the secondary media content.

11. The system of claim 10, wherein:
the memory has transactional payment information stored thereon in association with the information relating to the user identifier; and
the computer is programmed further to effect the purchase transaction on behalf of the user in accordance with the transactional payment information responsive to receiving the communication from the unpaired device.

12. The system of claim 1, wherein the unpaired device is a smart phone.

13. A method comprising:
providing primary media content to a television receiver over a provider network in response to receiving a request for the primary media content from the television receiver over the provider network, the primary media content configured for display on a display device in communication with the television receiver, the request for the primary media content indicating a user identifier associated with the television receiver;

selecting secondary media content from a plurality of secondary contents automatically by a server, based on the providing the primary media content and based on the user identifier, the secondary media content associated with transferrable data;

directing the television receiver, by the server, to display the secondary media content on the display device concurrent with displaying the primary media content;

receiving, by the server from the television receiver, a request for the transferrable data generated by the television receiver responsive to the television receiver receiving input from a paired wireless input device indicating an interaction by a user with the display of the secondary media content, the paired wireless input device paired with the display device;

providing the transferrable data for display to the user via an unpaired device in response to receiving the request for the transferrable data, the unpaired device identified via a remote server request based on the user identifier, the unpaired device not in direct communication with the television receiver, not paired with the television receiver, and not paired with the paired wireless input device; and receiving a communication, by the server from the unpaired device, corresponding to a transaction by the user initiated via the unpaired device responsive to the transferrable data.

14. The method of claim 13, wherein the directing comprises providing the secondary media content to the television receiver over the provider network.

15. The method of claim 13, wherein the directing comprises directing the television receiver to retrieve secondary media content stored by the television receiver in accordance with the selecting.

16. The method of claim 13, wherein:
the primary media content comprises metadata; and
the selecting is based on the metadata of the primary media content.

17. The method of claim 13, wherein the selecting is based on one or more selection criteria based on a time at which the primary media content is being consumed, an identity of the user consuming the primary media content, a geographic location at which the primary media content is being consumed, and/or a category associated with the primary media content.

18. The method of claim 17, wherein the selecting comprises:
  selecting a set of candidate secondary media contents based on the one or more selection criteria; and
  filtering the set of candidate secondary media contents to select the secondary media content according to one or more user-defined criteria.

19. The method of claim 13, wherein:
  the providing the transferrable data is such that the display device shows a hyperlink; and
  the receiving the communication from the unpaired device is at least responsive to the user interacting with the hyperlink.

20. The method of claim 13, wherein the transaction by the user is associated with a purchase transaction for a good or service indicated by the secondary media content, and further comprising:
  performing, responsive to receiving the communication from the unpaired device, at least a portion of the purchase transaction by the server on behalf of the user in accordance with transactional payment information stored by the server in association with the information relating to the user identifier.

* * * * *